United States Patent
Schnaars et al.

(10) Patent No.: US 8,534,647 B2
(45) Date of Patent: Sep. 17, 2013

(54) HYDRAULICALLY DAMPING ELASTOMERIC BUSHING

(75) Inventors: Wolfgang Schnaars, Osnabrück (DE); Thomas Conrad, Treuchtlingen (DE)

(73) Assignee: Audi AG, Ingolstadt (DE)

(*) Notice: Subject to any disclaimer, the term of this patent is extended or adjusted under 35 U.S.C. 154(b) by 359 days.

(21) Appl. No.: 12/597,836

(22) PCT Filed: May 6, 2008

(86) PCT No.: PCT/DE2008/050011
§ 371 (c)(1),
(2), (4) Date: Jan. 7, 2010

(87) PCT Pub. No.: WO2008/138332
PCT Pub. Date: Nov. 20, 2008

(65) Prior Publication Data
US 2010/0109213 A1      May 6, 2010

(30) Foreign Application Priority Data
May 10, 2007    (DE) .......................... 10 2007 022 410

(51) Int. Cl.
*F16F 11/00*    (2006.01)
(52) U.S. Cl.
USPC .............. 267/140.12; 267/141.1; 267/141.11; 267/141.13; 267/141.14; 267/293; 29/898.067
(58) Field of Classification Search
USPC .. 267/140.12, 141.1–141.5, 293; 29/898.067
See application file for complete search history.

(56) References Cited

U.S. PATENT DOCUMENTS

| | | | | |
|---|---|---|---|---|
| 3,570,031 A | * | 3/1971 | Auriol | 470/191 |
| 3,666,301 A | * | 5/1972 | Jorn | 403/228 |
| 3,976,338 A | * | 8/1976 | Trachte et al. | 384/220 |
| 4,007,924 A | * | 2/1977 | Jorn et al. | 267/282 |
| 4,749,174 A | * | 6/1988 | Kanda | 267/140.12 |
| 4,936,557 A | * | 6/1990 | Schwerdt | 267/141.2 |
| 4,958,811 A | * | 9/1990 | Brenner et al. | 267/140.12 |
| 4,998,345 A |   | 3/1991 | Funahashi et al. | |
| 5,060,918 A | * | 10/1991 | Kanda | 267/140.12 |
| 5,356,121 A | * | 10/1994 | Ikeda | 267/140.12 |

(Continued)

FOREIGN PATENT DOCUMENTS

| | | |
|---|---|---|
| DE | 38 18 287 A1 | 7/1989 |
| DE | 43 05 173 A1 | 8/1994 |

(Continued)

*Primary Examiner* — Robert A Siconolfi
*Assistant Examiner* — Mahbubur Rashid
(74) *Attorney, Agent, or Firm* — Davis & Bujold, PLLC

(57) ABSTRACT

An elastomeric bush bearing, with hydraulic damping, comprises a metallic inner part (1), an elastomeric bearing element (2) encompassing the inner part (1) with a cage (3) for reinforcing the bearing element (2) vulcanized thereto. At least two chambers (5), for accommodating a fluid damping medium, are separated from one another by partitions (8), constructed between the bearing element (2), adhesively bonded to the inner part (1) by the vulcanization, but are mutually connected by a damping medium channel (7). A prestressing is applied to the elastomer of the bearing element (2). However, the prestressing is not applied over the bearing shell (4), but instead over the cage (3). Calibration takes places thus by a pressure force exerted on the cage, before assembly of the bearing element (2) in the outer shell (4), which is a deviation from the state of the art.

15 Claims, 3 Drawing Sheets

(56) References Cited

U.S. PATENT DOCUMENTS

| | | | | |
|---|---|---|---|---|
| 5,413,319 A | * | 5/1995 | Hein et al. | 267/140.12 |
| 5,509,643 A | * | 4/1996 | Carstens et al. | 267/140.12 |
| 5,560,593 A | * | 10/1996 | Hofmann et al. | 267/219 |
| 5,690,320 A | * | 11/1997 | Kanda | 267/140.12 |
| 7,165,909 B2 | * | 1/2007 | Buhl et al. | 403/132 |
| 7,350,775 B2 | * | 4/2008 | Sato et al. | 267/140.12 |
| 7,441,759 B2 | * | 10/2008 | Franke et al. | 267/282 |
| 2003/0151178 A1 | * | 8/2003 | Vossel et al. | 267/140.12 |
| 2006/0220286 A1 | | 10/2006 | Borgerding et al. | |
| 2007/0235912 A1 | | 10/2007 | Sato et al. | |

FOREIGN PATENT DOCUMENTS

| | | |
|---|---|---|
| DE | 38 00 656 A1 | 8/1998 |
| DE | 199 37 714 A1 | 3/2001 |
| DE | 102 13 627 A1 | 10/2003 |
| DE | 10 2005 014 834 A1 | 10/2006 |
| DE | 10 2006 047 445 A1 | 4/2008 |
| EP | 0 406 835 A2 | 1/1991 |
| JP | 2003 278823 A | 10/2003 |

\* cited by examiner

HYDRAULICALLY DAMPING ELASTOMERIC BUSHING

This application is a National Stage completion of PCT/DE2008/050011 filed May 6, 2008, which claims priority from German Patent application serial no. 10 2007 022 410.0 filed May 10, 2007.

FIELD OF THE INVENTION

The invention concerns a hydraulically damping elastomeric bushing, that is, an elastomeric bush bearing with a hydraulic damping system, which is preferably provided for use for mounting the axle carrier of a motor vehicle.

BACKGROUND OF THE INVENTION

Elastomeric bush bearings or rubber bushings of this kind with hydraulic damping consist of an inner part, which is generally metallic and essentially cylindrical in shape, a bearing element arranged concentrically with respect to the inner part and connected with it by means of vulcanization, and an outer shell that accommodates the inner part with the bearing element. At least two chambers for accommodating elastomeric damping medium, which are mutually connected via a damping medium channel and are spatially separated in peripheral direction by means of partitions of the bearing element extending in radial direction, are constructed between the outer contour of the elastomeric body and the outer shell by means of this outer body. The damping medium chambers and the channel connecting these form a hydraulic damping system that supports the radial damping effect of the bearing in the area of the chambers. Correspondingly designed hydrobushings are known, for example, from DE 38 18 287 A1 and DE 102 13 627 A1.

According to the state of the art, it is customary to calibrate appropriate bush bearings after introducing the rubber-metal parts formed by the inner part and the bearing element into the outer shell by means of a reduction of its outer diameter. In this way, the elastomer of the bearing element is acted upon by prestressing, and the hydraulic damping of the bearing is increased. The swelling walls are exposed to increased load in the chambers or in the damping medium accommodated therein based on the overpressure generated therein, whereby the stability under load or the durability of the bearing is reduced in a disadvantageous manner. The spring rate ratios that can be achieved in this way are nonetheless comparatively limited between the partitions running in radial main stress direction of the bearing, on the one hand, and its other main stress direction running over the chambers, on the other hand, as well as radial main stress direction running over the partitions and axial direction of the bearing, since a greater spreading of the spring rates at the expense of the durability would not be acceptable. With a simultaneously justifiable durability, the spring rate ratios from the state of the art of known hydraulically damping rubber bushings amount to approximately 5:1 radially over the partitions separating the chambers to radially over the chambers (with reference to the axle carrier bearing:transversal vehicle direction to longitudinal vehicle direction) or approximately 6:1 radially over the partitions to axially (with reference to the axle carrier bearing: transversal vehicle direction to vertical vehicle direction). Higher spring rate ratios with regard to the different case of operation and a best possible driving comfort are definitely desirable in many cases.

SUMMARY OF THE INVENTION

It is an object of the invention to construct a hydraulically damping bush bearing of this kind in such a way, in contrast with the state of the art, that higher spring rate ratios with high durability are achieved with reference to a radial main stress direction running over the partitions and likewise its axial and also its other radial main stress direction running over the chambers.

The elastomeric bush bearing with hydraulic damping proposed to accomplish the objective consists, as is basically known, of a metallic inner part, an elastomeric body that encompasses the inner part, preferably concentrically, with a cage vulcanized therein for reinforcing the bearing element and an outer shell that accommodates the inner part with the bearing element. The bearing element is preferably adhesively bonded by means of vulcanization to the metallic inner part. A rubber-metal part should also be discussed in this connection with regard to the unit formed by the inner part and the bearing element with the vulcanized cage, even though other elastomeric materials can of course be taken into consideration in addition to rubber as material for the bearing element.

The outer contour of the bearing element is constructed in such a way that at least two chambers for accommodating fluid damping medium are constructed between it and the outer shell, into which the inner part and the bearing element are introduced. The chambers are separated from each other, as already explained, by means of partitions made from the material of the bearing element, which project in radial direction from the inner part with reference to the peripheral direction of the bearing element. In order to construct a hydraulic damping system, the chambers are connected to each other by means of a damping medium channel arranged on or in the bearing element.

However, a prestress is applied to this extent according to the invention on the elastomer of the bearing element over the cage in the bush bearing analogously to bearings known from the state of the art. It is rather customary to produce a prestress in the elastomer of the bearing element only after its assembly in the outer shell by applying a pressure over its periphery by means of a tool suitable for this purpose and thus reducing its diameter as the prestress is produced. A calibration such as this takes place in the bearing according to the invention before assembly of the bearing element in the outer shell by exerting a corresponding pressure force on the cage. According to an embodiment of the invention, the latter is provided for this purpose with several areas, which are devoid of the elastomer of the bearing element. Clearances are constructed on the appropriate points in the bearing element. In this way, it is possible to apply pressure directly from metal (metal of the tool) to metal (metal of the cage) on the cage and to calibrate the rubber-metal part before its assembly in the outer shell. The formation of an overpressure is advantageously avoided in this way in the chambers for damping medium (which are only complete with assembly), which would stress the swelling walls axially delimiting the chambers and thus reduce the durability of the bearing in this way.

According to a possible embodiment, the already addressed clearances are constructed in the partitions that spatially separate the chambers from each other with reference to the peripheral direction. Two clearances are preferably constructed in each of the partitions arranged in the area of the axial ends of the bearing element.

According to a particularly advantageous embodiment of the bearing of the invention, the cage is constructed in such a way that it has a radial inner surface that runs parallel to the bearing axle within the partitions that separate the chambers. This has the advantage that in particular, even after the calibration, that is, after applying a prestress on the elastomer over the cage, the stress in the partition area is evenly distributed. The durability of the bearing is likewise improved in this way. In the bearings known from the state of the art, instead, the cage is generally constructed in such a way that it forms a tapering directed toward the inner part in an axial section in the area of the partitions of the bearing element that separate the chambers. In this tapered area, a channel carrier is usually inserted on the periphery of the bearing element in which the damping medium channel that interconnects the chambers is constructed. The channel carrier is clipped, for example, on the bearing element or is constructed in two parts in peripheral direction.

In the last described embodiment of the bearing according to the invention, the channel carrier is modified so that it has a recess extending in peripheral direction in each of the peripheral sections of the partitions of the bearing element as a result of the lack of a corresponding tapering (the radial inner surface of the cage runs parallel to the bearing axle) within the area of the partitions, so that the channel is merely axially framed on both sides by two struts of the channel carrier that delimits the recess in these areas, while the channel base located between them is formed by the elastomer of the bearing element.

According to other embodiments, the inner part of the bearing according to the invention can have a shape that deviates from the cylindrical shape and a radial stop can be axially constructed on both sides of the chambers. Corresponding radial stops are constructed therein by means of a plastic ring slid onto the axial ends of the bearing over its inner part.

The process of the invention concerns a process for producing an appropriate elastomeric bush bearing with hydraulic damping. According to this process, it is provided according to the invention that several areas made from the elastomer of the bearing element are formed on the cage with the vulcanization of the cage in the bearing element by means of a corresponding configuration of the mold utilized for this purpose. Pressure is exerted on these areas by means of a tool during the course of the process before introducing the rubber-metal parts consisting of the inner part and the vulcanized cage into the outer shell and the diameter of the cage is reduced while prestress is formed in this way in the elastomer of the bearing element. Insofar as it was discussed above and also in connection with the description of the bearing concerning the fact that the corresponding areas via which the predetermined pressure force is applied by means of tools serving for calibration are devoid of the elastomer of the bearing element, this means that these areas of the cage are not covered by a rubber layer, which contributes to the radial damping of the bearing. This does not exclude that the pertaining areas are covered by a thin rubber layer, which forms during production, but which is negligible (with a thickness of less than m).

The process according to the invention is advantageously further developed in that, areas of the cage are also devoid aside from clearances of the channel carrier that serve for the actual calibration, which serve for positioning the calibration tool. According to an embodiment of the process used in the practice, the assembly of the already calibrated rubber-metal part in the outer shell takes place under fluid, that is, in a bath containing damping medium.

BRIEF DESCRIPTION OF THE DRAWINGS

The invention will now be described in further detail with reference to an embodiment. In the associated drawings.

DETAILED DESCRIPTION OF THE PREFERRED EMBODIMENTS

Figure 1:
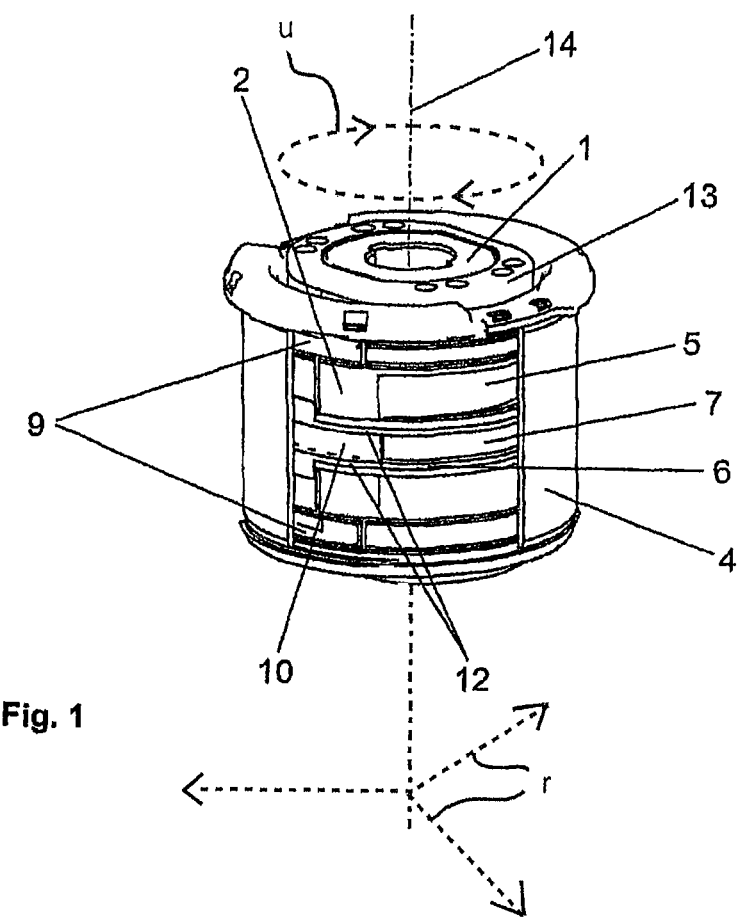
FIG. 1: shows a possible configuration of the bearing according to the invention in spatial representation.

FIG. 1 shows a possible configuration of the bearing according to the invention, which is provided, for example, for use as hydraulic axle carrier bearing. The elastomeric bush bearing shown in spatial representation consists basically of the metallic, approximately cylinder-shaped inner part 1, the elastomeric bearing element 2 or rubber body, which concentrically encompasses the inner part 1, the cage 3 vulcanized in the bearing element 2 (which can be seen best in FIG. 2), and an outer shell 4, which accommodates the inner part 1 with the bearing element 2 and the cage 3 vulcanized therein. The cage 3 is very difficult to see in the representation of FIG. 1, since it is vulcanized into the bearing element 2, as explained. It can merely be seen in this representation insofar as the elastomeric bearing element 2 of the bearing has several clearances 9 according to the invention. In order to realize the hydraulic damping system, two chambers 5 for accommodating fluid damping medium are constructed in the bearing element 2, of which one can again be seen better in FIG. 2. The chambers 5 are spatially separated from each other with reference to the circumference of the bearing by means of elastomeric partitions 8 constructed by the bearing element 2, but are mutually connected by means of a damping medium channel 7, via which damping medium can be displaced into the other chamber when it is radially pressurized from a chamber 5. The chambers 5 are delimited by the swelling walls 15 in axial direction a. The channel 7 is constructed of plastic in a channel carrier 6 arranged on the outer periphery of the bearing element 2. The rubber-metal part formed by the inner part 1 and the bearing element 2 with the cage 3 vulcanized in it is calibrated before its assembly in the outer shell 4. A pressure is exerted by means of a suitable tool for this purpose on the cage 3 in the area of the clearances 9, and this has as a result that the diameter or curvature radius of the cage 3 has been reduced while forming a prestress in the elastomer of the bearing element 2. Because the inner part 1 and the bearing element 2 are only introduced into the outer shell 4 after this calibration procedure under fluid, that is, in a damping medium bath, and the chambers 5 are only completed thereby, the result is that a prestress of the elastomer is achieved in the chambers 5 without a pressure buildup that reduces the durability. In order to distribute the prestress in the area of the partitions 8 as evenly as possible, the cage 3 has also been modified in the represented embodiment. The prestress in the elastomer causes that the desired paths/loads can be realized in particular in vertical direction that determines the driving comfort. The current demands cannot be implemented with respect to driving comfort or driving dynamics, and at the same time durability with respect to bearings according to the state of the art.

Figure 2:
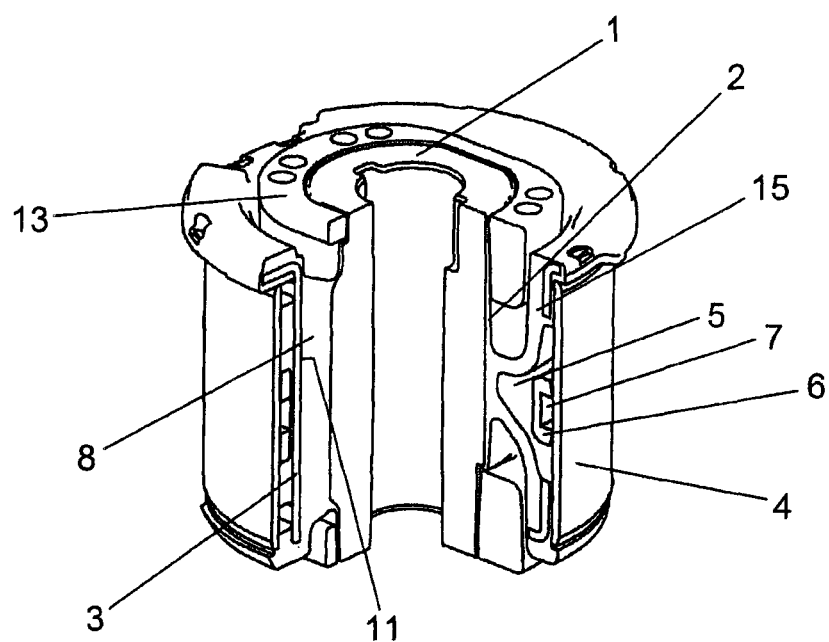
FIG. 2: shows the bearing of FIG. 1 in a partial sectional representation.
Figure 3:
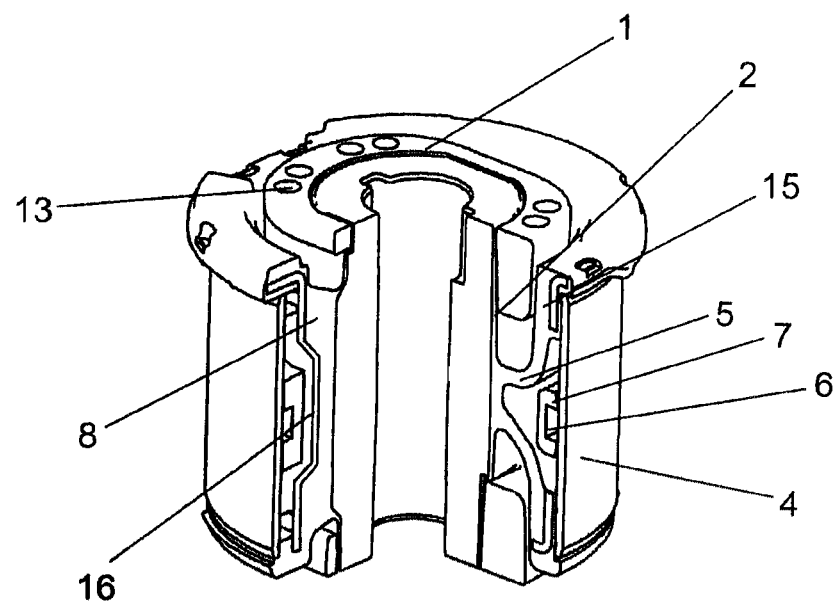
FIG. 3: shows a bearing according to the state of the art similar to the bearings of FIG. 1 or FIG. 2.

FIGS. 2 and 3 make possible a comparison, by means of which this modification of the cage shape can be displayed. FIG. 2 shows the bearing according to the invention according to FIG. 1 with the correspondingly modified cage 3 in a partially cut representation, while FIG. 3 shows a comparable bearing according to the state of the art in likewise partially cut representation. According to the state of the art, as can be seen in FIG. 3, it is customary to taper the cage 3 in the area of the partitions 8 and to insert the channel carrier 6 into the produced tapering 16. In the embodiment of the bearing according to the invention represented, a tapering 16 such as this is omitted in this design, as can be seen in FIG. 2. The radial inner surface 11 of the cage 3 in the embodiment according to FIG. 2 runs rather parallel to the bearing axle 14 in the area of the partitions 8 of the bearing element 2 with reference to the axial direction a. An even introduction of the prestress in the area of the partitions 8 is achieved in this way.

The channel carrier 6 has moreover been modified in an adaptation to the cage 3 modified in the described manner in the embodiment of the bearing according to the invention presented and explained as example. As can be seen in FIG. 1, the channel carrier 6 has respectively a recess 10 running in peripheral direction u in the area of the partitions 8. The channel is consequently separated in this area by two struts 12, which delimit the corresponding recess 10 in the channel carrier 6 in axial direction a as well as by means of an elastomer of the appropriate partition 8 and the outer shell 4 in radial direction r. The channel base is thus formed by the elastomer of the bearing element 2 in this area, in deviation from the state of the art.

When used for its intended purpose as an axle carrier bearing, the bearing shown in FIGS. 1 and 2 is installed in such a way that the bearing axle 14 is arranged in vertical vehicle direction. Vibrations transmitted from the chassis to the vehicle body are damped in this vertical direction. The radial main stress direction of the bearing transmitted via the chambers 5 runs at the same time parallel to the longitudinal vehicle axis (allusion is made in this respect to the longitudinal direction), while its other radial main stress direction runs transversely to the longitudinal vehicle axis (allusion is made to the vertical direction). Spring rate ratios of up to approx. 13:1 (transversal to vertical direction) and up to approx. 9:1 (transversal to longitudinal direction) can be achieved with the invention. A plastic ring is slid onto both axial ends, respectively, by means of which radial stops 13 for limiting the radial spring travel are constructed, for protection against excessive stress in longitudinal direction, that is, in relation to large radial forces transmitted via the chambers 5 into the bearing.

REFERENCE NUMBER LIST

1 Inner part
2 Bearing element
3 Cage
4 Outer shell
5 Chamber
6 Channel carrier
7 Damping medium channel
8 Partition
9 Clearance, clearance
10 Recess
11 Inner surface
12 Strut
13 Radial stop
14 Bearing axle
15 Swelling wall
16 Tapering

The invention claimed is:

1. An elastomeric bush bearing comprising:
a metallic inner part (1),
an elastomeric bearing element (2) encompassing the inner part (1) with a cage (3) vulcanized therein,
an outer shell (4) accommodating both the inner part (1) and the bearing element (2),
at least two chambers (5), for accommodating a damping medium located against the outer shell (4), being formed between an outer contour of the bearing element (2) and the outer shell (4),
at least a pair of partitions (8) located between and spatially separating the at least two chambers (5) from one another,
at least one damping medium channel (7) constructed either on or in the bearing element (2) and connecting the at least two chambers (5) with one another, and
before the inner part (1), the bearing element (2) and the cage (3) are assembled with the outer shell (4), a force being directly applied to the cage (3) for reducing a dimension of the cage (3), but not the outer shell (4), so as to calibrate and prestress the elastomer of the bearing element (2), and
following assembly of the inner part (1), the bearing element (2) and the cage (3) in the outer shell (4), the at least two chambers (5) being supplied with the damping medium to complete assembly of the elastomeric bush bearing such that the elastomer of the bearing element (2) is prestressed without pressurizing the damping medium.

2. The elastomeric bush bearing of claim 1, wherein the bearing element (2) has clearances (9) and areas of the cage (3) are devoid of the elastomer of the bearing element (2).

3. The elastomeric bush bearing of claim 2, wherein the clearances (9), in which partitions (8) are formed and separate the at least two chambers (5) from each other with reference to the peripheral direction (u).

4. The elastomeric bush bearing of claim 3, wherein two clearances (9), respectively arranged in an area of axial ends of the bearing element, are constructed in each partition (8).

5. The elastomeric bush bearing of claim 2, wherein a radial inner surface (11) of the cage (3), cut out into an area of the pair of partitions (8), runs parallel to a longitudinal axis (14) of the bearing from a first axial end of the reinforcement cage (3), adjacent to a top end of the elastomeric bush bearing, to a second opposite axial end of the reinforcement cage (3), adjacent to a bottom end of the elastomeric bush bearing.

6. The elastomeric bush bearing of claim 5, wherein the damping medium channel (7), that connects the at least two chambers (5), is constructed in a channel carrier (6) arranged over a periphery of the bearing element (2) in an area of each of the partitions (8), which has a recess (10) that extends in the peripheral direction (u) in the area of the partitions (8) over the entire partition (8), such that the channel (7), in the area of the partitions (8), is directly encased, in an axial direction (a), by two struts (12) that delimit the respective recess (10) and, in radial direction (r), by the elastomer of the corresponding partition (8) and the outer shell (4).

7. The elastomeric bush bearing of claim 1, wherein the inner part (1) has a shape which deviates from a cylindrical shape.

8. The elastomeric bush bearing of claim 1, wherein a radial stop (13) is axially formed on both sides of the at least two chambers (5).

9. The elastomeric bush bearing of claim 8, wherein the radial stops (13) are each formed by a plastic ring that is slid onto the inner part (1) at the axial ends of the elastomeric bush bearing.

10. The elastomeric bush bearing of claim 2, wherein the reinforcement cage (3) has a radially inner surface (11) in contact with the partitions (8) of the elastomeric element (2), the radially inner surface (11) extends substantially parallel to a bearing axis (14) such that the prestressing, via the reinforcement cage (3), is applied evenly along substantially an entire axial length of the partitions (8) from a first axial end of the reinforcement cage (3) to a second opposite axial end of the reinforcement cage (3).

11. A process of producing an elastomeric bush bearing with hydraulic damping which comprises a metallic inner part (1), an elastomeric bearing element (2) encompassing the inner part (1) with a cage (3) vulcanized therein and an outer shell (4) accommodating the inner part (1) with the bearing element (2), at least two chambers (5), for accommodating a damping medium, arranged over a periphery of the bearing element (2) and being mutually connected by a damping medium channel (7), the method comprising the steps of:

constructing clearances (9), devoid of the elastomer of the bearing element (2) on the cage (3), with the vulcanization of the cage (3) in the bearing element (2) by a corresponding configuration of a mold utilized for this purpose;

exerting pressure by a tool upon the clearances (9) so as to reduce a diameter of the cage (3) and apply a prestressing to the elastomer of the bearing element (2) to prestress and calibrate the bearing, prior to insertion of the inner part (1), the bearing element (2) and the cage (3) into the outer shell (4), without prestressing the outer shell (4);

thereafter inserting the inner part (1), the prestressed bearing element (2) and the cage (3) into the outer shell (4);

following insertion of the inner part (1), the bearing element (2) and the cage (3) into the outer shell (4), immersing the elastomeric bush bearing in a bath of the damping medium and filling the at least two chambers (5) with the damping medium to complete assembly of the elastomeric bush bearing such that the elastomer of the bearing element (2) is prestressed without pressurizing the damping medium during assembly of the elastomeric bush bearing.

12. The method of claim 11, further comprising the step of, to aid in calibration of the bearing, positioning the tool with respect to further areas of the cage (3) that are devoid of the elastomer in addition to the clearances (9) that serve for calibration of the bearing.

13. The method of claim 11, further comprising the step of introducing the inner part (1) with the bearing element (2), the cage (3) that is vulcanized therein, and a channel carrier (6) that is arranged over the periphery of the bearing element (2) into the outer shell (4) in a bath containing the damping medium.

14. An elastomeric bush bearing comprising:
a cylindrical inner part (1) being encompassed by an elastomeric bearing element (2);
a reinforcement cage (3) being vulcanized in the elastomeric bearing element (2);
an outer shell (4) housing the inner part (1), the bearing element (2) and the reinforcement cage (3), and the elastomeric bearing element (2) having a contour such that at least two chambers (5) are formed therein with the bearing element (2) having partitions (8) which at least partially define the at least two chambers (5);
a channel carrier (6) being arranged about the outer periphery of the bearing element (2), the channel carrier (6) contacting the outer shell (4) and forming a channel (7) that connects the at least two chambers (5) with one another and facilitates fluid communication therebetween; and
the reinforcement cage (3) having a radially inner surface (11) in contact with the partitions (8), the radially inner surface (11) extending substantially parallel to a bearing axis (14), and a force being applied to the cage (3) for reducing a dimension of the cage (3) and applying a prestressing to the elastomer of the bearing element (2), prior to insertion of the inner part (1), the bearing element (2) and the cage (3) into the outer shell (4) such that a prestressing, via the reinforcement cage (3), is applied evenly along a complete axial length of the partitions (8), without prestressing the outer shell (4); and
following assembly of the inner part (1), the bearing element (2) and the cage (3) in the outer shell (4), the at least two chambers (5) being supplied with the damping medium, by immersing the elastomeric bush bearing in a bath of the damping medium, to complete assembly of the elastomeric bush bearing such that the elastomer of the bearing element (2) is prestressed without pressurizing the damping medium.

15. The method of claim 11, wherein the elastomeric bush bearing further comprises at least two chambers (5) located against the outer shell (4) and formed between the bearing element (2) and the outer shell (4), due to the outer contour of the bearing element (2), the at least two chambers (5) are spatially separated, in a peripheral direction (u) of the bearing, by partitions (8) located between the at least two chambers (5), the damping medium channel (7) is constructed either on or in the bearing element (2), and a prestressing being applied to the elastomer of the bearing element (2) over the cage (3).

* * * * *